(12) United States Patent
Okuizumi et al.

(10) Patent No.: US 8,228,018 B2
(45) Date of Patent: Jul. 24, 2012

(54) CONTROL SYSTEM FOR MOTOR

(75) Inventors: Masaru Okuizumi, Ise (JP); Manabu Himeno, Ise (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 330 days.

(21) Appl. No.: 12/729,825

(22) Filed: Mar. 23, 2010

(65) Prior Publication Data

US 2010/0237820 A1 Sep. 23, 2010

(30) Foreign Application Priority Data

Mar. 23, 2009 (JP) ................................. 2009-069413

(51) Int. Cl.
*G05D 23/275* (2006.01)
*H02P 6/00* (2006.01)
*G05B 11/01* (2006.01)
*G05B 9/02* (2006.01)

(52) U.S. Cl. .................. 318/632; 318/400.01; 318/560; 318/561; 318/563

(58) Field of Classification Search ............. 318/400.01, 318/560, 561, 563, 632
See application file for complete search history.

(56) References Cited

U.S. PATENT DOCUMENTS

| | | | | |
|---|---|---|---|---|
| 5,689,163 A | * | 11/1997 | Ohnishi | 318/603 |
| 6,081,087 A | * | 6/2000 | Iijima et al. | 318/400.13 |
| 6,812,668 B2 | * | 11/2004 | Akiyama | 318/610 |
| 7,486,043 B2 | * | 2/2009 | Atarashi | 318/494 |
| 7,772,797 B2 | * | 8/2010 | Sato et al. | 318/801 |
| 2003/0178958 A1 | * | 9/2003 | Akiyama | 318/280 |
| 2006/0022628 A1 | * | 2/2006 | Okumatsu et al. | 318/437 |

FOREIGN PATENT DOCUMENTS

JP 2005-329478 12/2005

* cited by examiner

*Primary Examiner* — Walter Benson
*Assistant Examiner* — Gabriel Agared
(74) *Attorney, Agent, or Firm* — Oblon, Spivak, McClelland, Maier & Neustadt, L.L.P.

(57) ABSTRACT

A motor control system includes a motor unit and a controller unit electrically connected therewith. The motor unit includes a motor, a resolver detecting a rotational angle of the motor and a first memory storing first error data for detection by the resolver of the motor's rotational angle. The controller unit includes a second memory storing second error data for detection by the resolver of the motor's rotational angle and a motor controller determining an actual rotational angle of the motor according to the detected rotational angle detected by the resolver and the second error data in the second memory and controls the motor's rotation according to the determined actual rotational angle. The motor unit or the controller unit further includes an update section updating the second error data with the first error data according to motor data in the first and second memories.

11 Claims, 6 Drawing Sheets

ERROR DATA

| DETECTED ROTATION ANGLE (v1) | ACTUAL ROTATION ANGLE (v2) | ERROR VALUE (v2-v1) |
|---|---|---|
| 0 | 0 | 0 |
| ⋮ | ⋮ | ⋮ |
| 120 | 180 | 60 |
| ⋮ | ⋮ | ⋮ |
| 240 | 240 | 0 |
| ⋮ | ⋮ | ⋮ |
| 360 | 360 | 0 |

FIG.4B

IDENTIFYING DATA

VERSION: SDK1.00

HASH VALUE: a1b2c3d4e5

CONTROL SYSTEM FOR MOTOR

BACKGROUND OF THE INVENTION

1. Field of the Invention

The present invention relates to a control system for a motor including a motor and controlling means for controlling the rotation of the motor.

2. Description of the Related Art

Figure 3:
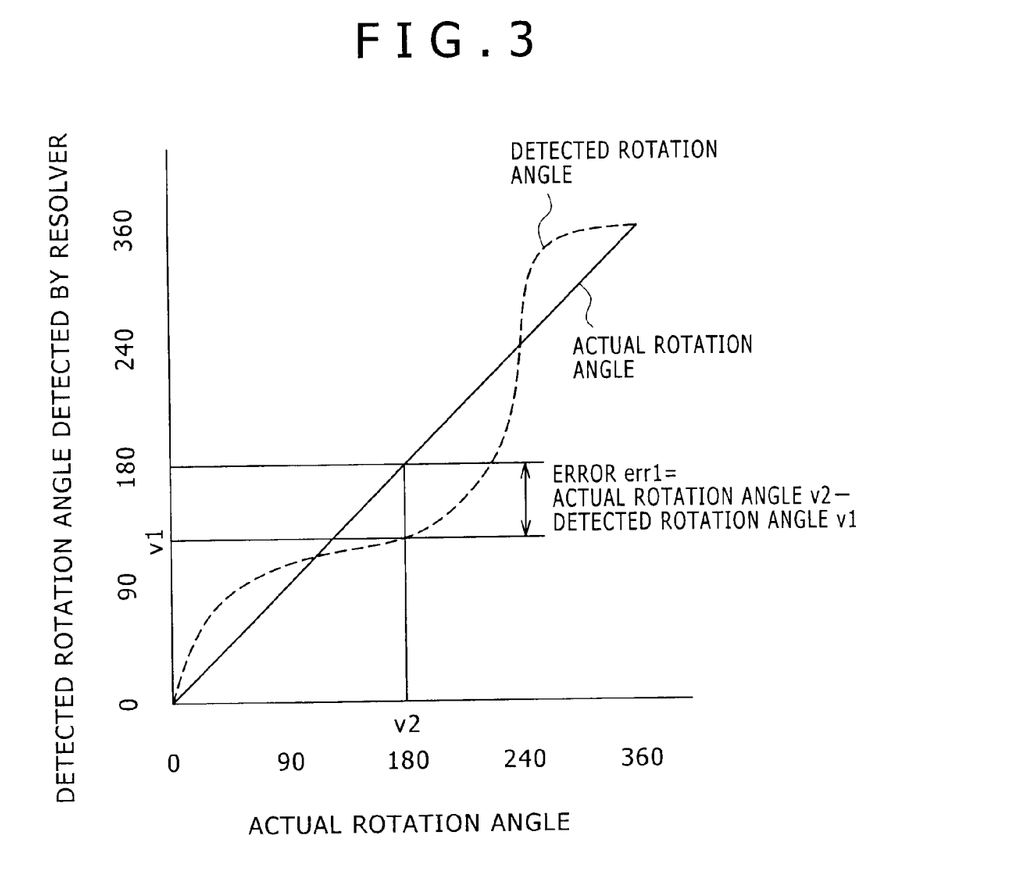
FIG. 3 is a diagram of assistance in explaining errors between rotation angles detected by a resolver and actual angles.

A manufacturing device such as an arm or the like used in a process of manufacturing a semiconductor or the like uses a control system for a motor that detects the rotation angle of a motor as a source of power to the manufacturing device and which controls the rotation of the motor on the basis of the detected rotation angle. An ordinary configuration of such a control system for a motor is composed mainly of a motor unit including a motor and detecting means for detecting the rotation angle of the motor and controlling means (driver) for controlling the rotation of the motor, the controlling means being electrically connected in a replaceable state to the motor unit. In order to be used in a manufacturing device such as an arm or the like, the detecting means uses a resolver capable of detecting a rotation angle even in a state of the rotation of the motor being stopped. However, as shown in FIG. 3, there is an error between the rotation angle detected by the resolver (which rotation angle will hereinafter be referred to also as a detected angle) and an actual rotation angle (which will hereinafter be referred to also as an actual angle). This error is a factor in hindering fine rotation control, and is different for each motor unit (the motor and the resolver).

A conventional control system for a motor described in Japanese Patent Laid-Open No. 2005-329478, for example, stores error data between a rotation angle detected by a resolver and an actual angle in a storing section of controlling means in order to determine the actual angle from the rotation angle detected including the error, and determines the actual angle by making a correction that subtracts an error value from the detected rotation angle using the error data.

SUMMARY OF THE INVENTION

The conventional control system for the motor as described above cannot correctly determine the actual angle unless the error data correctly corresponds to the motor unit. Therefore the error data stored in the controlling means and the motor unit need to be in correct one-to-one correspondence with each other.

In order to deal with many kinds of motor units by one controlling means (driver), the inventors of the present invention et al. considered for example controlling means configured to allow error data to be rewritten manually after the memory of the controlling means is connected to an external personal computer or the like each time a motor unit connected to the controlling means is replaced or controlling means configured to allow error data corresponding to a motor unit after replacement to be selected manually after a plurality of pieces of error data corresponding to a plurality of kinds of motor units, respectively, are stored in the memory of the controlling means. However, each controlling means requires a manual operation of correctly associating the error data of the controlling means with a motor unit, which operation is troublesome. In addition, an error may be caused by the manual operation.

Further, a nonvolatile memory such as a flash memory or the like is generally employed as the memory of the controlling means which memory stores the error data because the memory needs to continue maintaining the storage of the error data even in a state of no power being supplied. However, the nonvolatile memory takes time to rewrite data, and thus it is not desirable to rewrite the error data frequently.

The present invention has been made with attention directed to such problems. It is an object of the present invention to provide a control system for a motor that eliminates the trouble of manual operation and occurrence of errors and which correctly and properly associates the error data of controlling means with a motor unit.

According to the present invention, a motor control system includes a motor unit and a controller unit electrically connected with the motor unit. The motor unit includes a motor, a resolver for detecting a rotational angle of the motor and a first memory for storing first error data for detection by the resolver of the rotational angle of the motor. The controller unit includes a second memory for storing second error data for detection by the resolver of the rotational angle of the motor and a motor controller for controlling rotation of the motor. The motor controller determines an actual rotational angle of the motor in accordance with the detected rotational angle detected by the resolver and the second error data stored in the second memory. The motor controller controls rotation of the motor in accordance with the determined actual rotational angle. One of the motor unit and the controller unit further includes an update section for updating the second error data stored in the second memory with the first error data stored in the first memory in accordance with motor data stored in the first memory and motor data stored in the second memory.

According to another aspect of the present invention, the update section updates the second error data stored in the second memory when the first error data is different from the second error data.

According to further aspect of the present invention, the first and second memories store first and second identification data for identifying the first and second error data, respectively. The first and second identification data are smaller in volume than the first and second error data. The update section updates the second error data when the first identification data is different from the second identification data.

According to yet another aspect of the present invention, the update section updates the second error data at a timing corresponding to when the motor control system is turned on.

According to yet further aspect of the present invention, each of the first and second error data further includes a plurality of error data provided for a plurality of corresponding rotational angles of the motor, respectively.

According to another aspect of the present invention, the first and second identification data is provided from identification information of the motor by using a hash function.

According to further aspect of the present invention, the update section further includes an update determining section for determining whether to update the second error data with the first error data in accordance with the motor data stored in the first memory and the motor data stored in the second memory. The update section further includes an update performing section updating the second error data with the first error data in accordance with determination of the update determining section.

According to yet another aspect of the present invention, the first memory is a read only memory and the second memory is a non-volatile memory.

According to yet further aspect of the present invention, the motor unit further includes a first communication interface and a first central processing unit for controlling the first memory and the first communication interface. The controller unit further includes a second communication interface for communicating with the first communication interface and a second central processing unit for controlling the second memory and the second communication interface.

According to another aspect of the present invention, a method of controlling a motor of a motor unit having a first memory and a resolver configured to detect a rotational angle of the motor is provided. The method includes comparing motor data stored in the first memory of the motor unit with motor data stored in a second memory of a controller unit electrically connectable with the motor unit, the first memory storing first error data for detection by the resolver of the rotational angle of the motor. The method also includes updating second error data stored in the second memory with the first error data stored in the first memory in accordance with a comparison result of the comparing step, determining an actual rotational angle of the motor in accordance with the detected rotational angle detected by the resolver and the second error data stored in the second memory and controlling rotation of the motor in accordance with the determined actual rotational angle.

Because the present invention has the above described Configuration, it is possible to save manpower, eliminate the trouble of manual operation and errors caused by manpower, and correctly and properly associate the error data of the controlling means with the motor unit.

DETAILED DESCRIPTION OF THE PREFERRED EMBODIMENT

Figure 1:
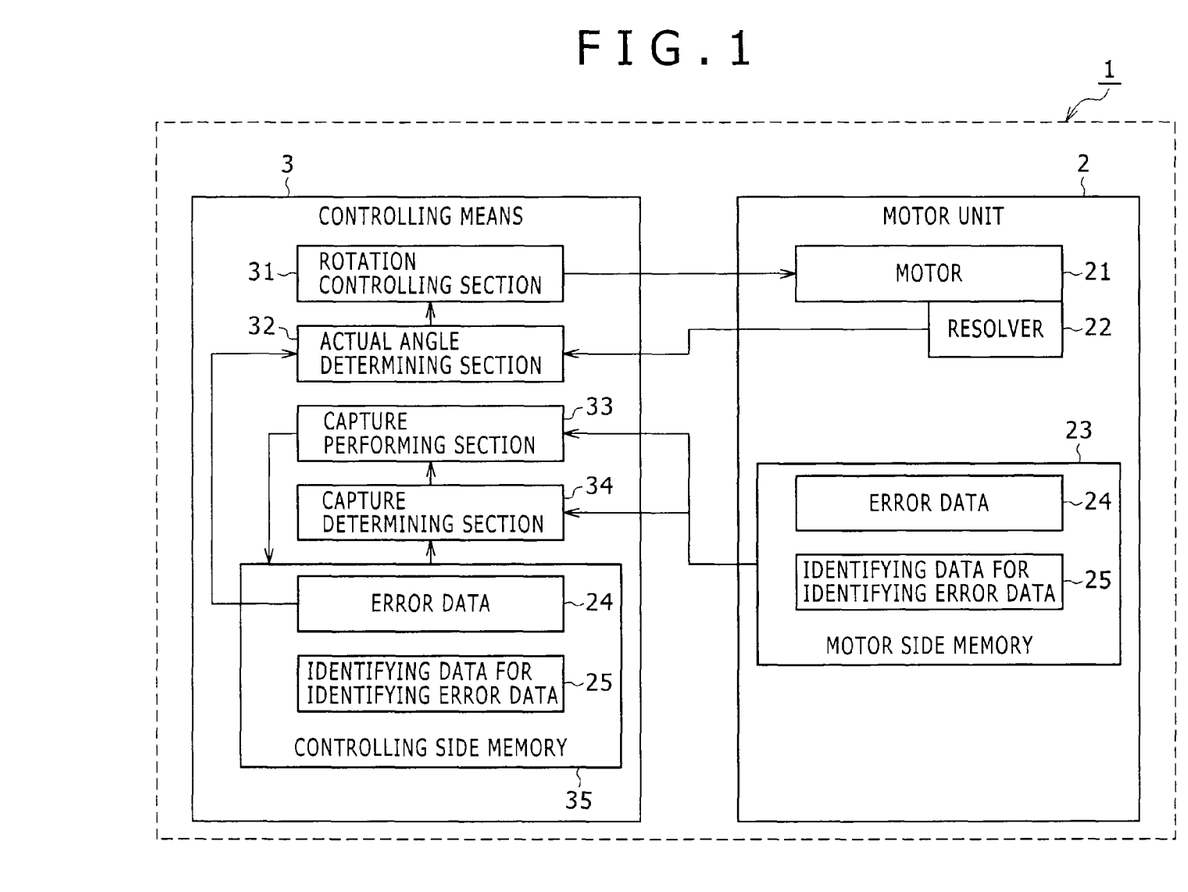
FIG. 1 is a functional block diagram of a control system for a motor according to an embodiment of the present invention.

Functions of a control system 1 for a motor according to an embodiment of the present invention will hereinafter be described with reference to FIG. 1.

The control system 1 for the motor includes a motor unit 2 and controlling means 3. The motor unit 2 includes a motor 21 and a resolver 22 for detecting the rotation angle of the motor 21.

The controlling means 3 includes a controlling side memory 35 for storing error data 24 between a rotation angle detected by the resolver 22 (which rotation angle will hereinafter be referred to also as a detected angle) and an actual rotation angle (which will hereinafter be referred to also as an actual angle), an actual angle determining section 32, and a rotation controlling section 31.

The error between the detected angle and the actual angle changes according to the rotation angle of the motor 21, and also differs for each individual motor 21. The error data 24 indicates the error between the detected angle and the actual angle, and directly or indirectly associates the detected angle and the actual angle with each other so that the actual angle can be determined from the detected angle.

The actual angle determining section 32 is electrically connected to the resolver 22. The actual angle determining section 32 determines the actual angle on the basis of the detected angle detected by the resolver 22 and the error data 24 stored in the controlling side memory 35.

The rotation controlling section 31 is electrically connected to the motor 21. The rotation controlling section 31 controls the rotation of the motor 21 on the basis of the actual angle determined by the actual angle determining section 32.

In addition to such a basic configuration, the present embodiment further includes a motor side memory 23 in the motor unit 2. The motor side memory 23 stores error data 24 identical with the error data 24 stored in the controlling side memory 35 and identifying data 25 for identifying the error data 24. The error data 24 in the motor side memory 23 is original data. The error data 24 in the controlling side memory 35 is obtained by capturing and copying the error data 24 in the motor side memory 23 by a capture performing section 33 to be described later. The controlling side memory 35 further stores the identifying data 25 for identifying the error data 24 in addition to the error data 24 obtained by capturing and copying the error data 24 in the motor side memory 23. The identifying data is lower in volume than the data volume of the error data. The identifying data has a correspondence such that only one piece of error data is present for one piece of identifying data (referred to also as specific data or unique data). The identifying data is used for a process of determining the identity of the error data by using the correspondence.

The controlling means 3 further includes a capture determining section 34 and a capture performing section 33. The capture determining section 34 is electrically connected to the motor side memory 23 so as to be able to communicate with the motor side memory 23. The capture determining section 34 determines whether to capture and store the error data 24 in the motor side memory 23 in the controlling side memory 35 on the basis of the storage of the controlling side memory 35 and the storage of the motor side memory 23. The capture performing section 33 is electrically connected to the motor side memory 23. When the capture determining section 34 determines that the error data 24 is to be captured, the capture performing section 33 reads the error data 24 and the identifying data 25 from the motor side memory 23, captures the error data 24 and the identifying data 25 into the controlling means 3, and stores these pieces of captured data in the controlling side memory 35.

Functions of the control system 1 for the motor according to an embodiment of the present invention have been described above. A concrete configuration for implementing these functions will be described in the following.

Figure 2:
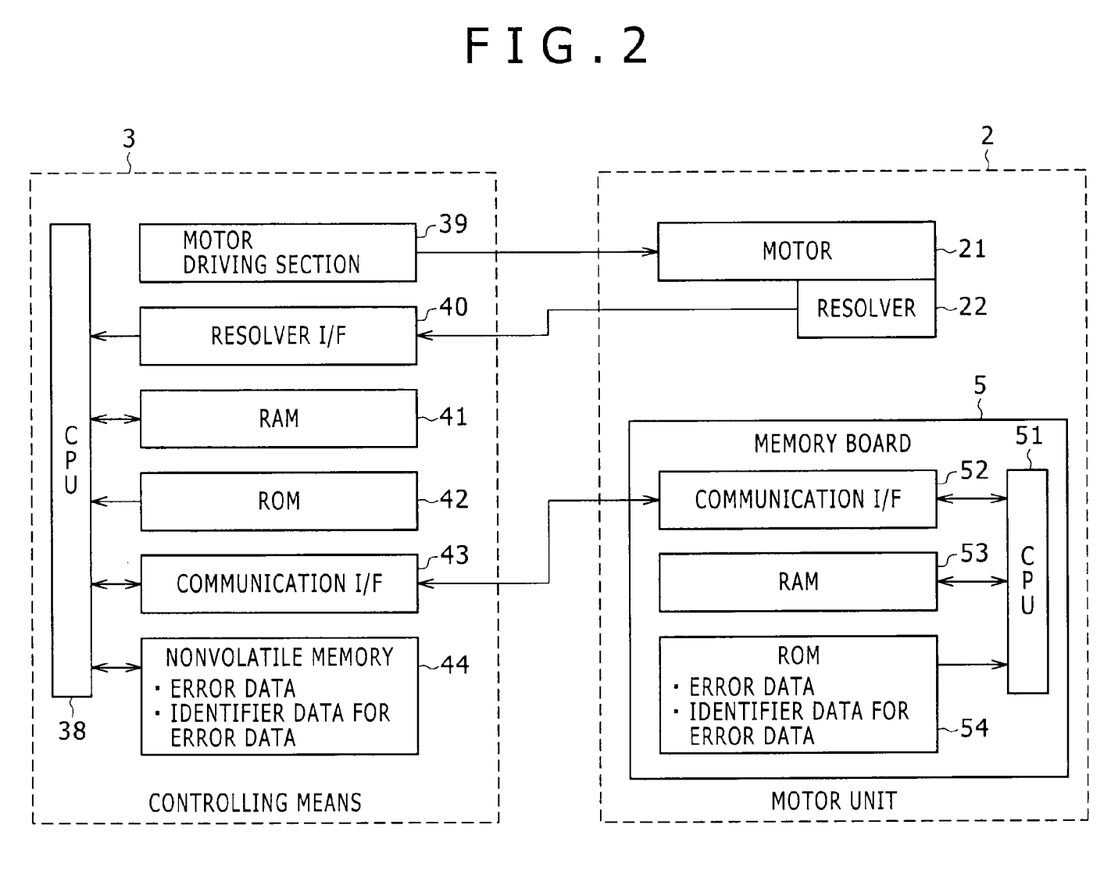
FIG. 2 is a more detailed block diagram of the same control system for the motor.

As shown in FIG. 2, a control system 1 for a motor of a concrete configuration includes a motor unit 2 and controlling means 3.

The motor unit 2 includes a motor 21, a resolver 22, and a memory board 5. The memory board 5 includes a ROM 54 for storing error data 24 and identifying data 25 as a motor side memory 23, a CPU 51 for transmitting the error data 24 and the identifying data 25 in the ROM 54 to the controlling means 3 on the basis of a request signal from the controlling means 3, a communication I/F 52 for relaying signals between the controlling means 3 and the CPU 51, the communication I/F 52 being connected to the controlling means 3 and the CPU 51, and a RAM 53 for temporarily storing data.

The controlling means 3 includes a CPU 38, a motor driving section 39, a resolver I/F 40, a RAM 41, a ROM 42, a communication I/F 43, and a nonvolatile memory 44. The CPU 38 implements the rotation controlling section 31, the actual angle determining section 32, the capture performing section 33, and the capture determining section 34 by executing a motor driving control processing routine not shown in the figures and a capture determining and performing processing routine to be described later. The motor driving section 39 supplies power for driving the motor 21 to the motor 21 according to a driving command from the CPU 38, thereby effecting rotation of the motor 21. The resolver I/F 40 supplies a detected angle to the CPU 38 according to a signal from the resolver 22. The RAM 41 temporarily stores a program being executed by the CPU 38 and data used when the program is executed. The ROM 42 stores each of programs executed by the CPU 38 and data used permanently. The programs stored in the ROM 42 are for example the motor driving control processing routine not shown in the figures and the capture determining and performing processing routine to be described later. The communication I/F 43 relays signals between the CPU 38 of the controlling means 3 and the CPU 51 of the memory board 5.

The nonvolatile memory 44 stores identical data to the error data 24 and the identifying data 25 captured from the memory board 5 of the motor unit 2 in order to use the identical data when determining an actual angle. A flash memory is employed as the nonvolatile memory 44 because of a need to continue maintaining the storage of these pieces of data even in a state of power not being supplied. However, the flash memory has a characteristic of taking time to rewrite data as compared with data reading time.

Next, describing the error between the detected angle and the actual angle by taking a concrete example, this error changes according to the rotation angle of the motor 21, and also differs for each individual motor 21, as described above. Specifically, as shown in FIG. 3, letting v1 be the detected angle detected by the resolver 22 and letting v2 be the actual angle, the error err1 is expressed as (v2−v1). As an example, when v1 is zero degrees, v2 is zero degrees, and err1=0 because the two angles coincide with each other. When v1 is 120 degrees, v2 is 180 degrees, and thus the two angles differ from each other. In this case, there is an error err1=60 degrees.

Figure 4A:
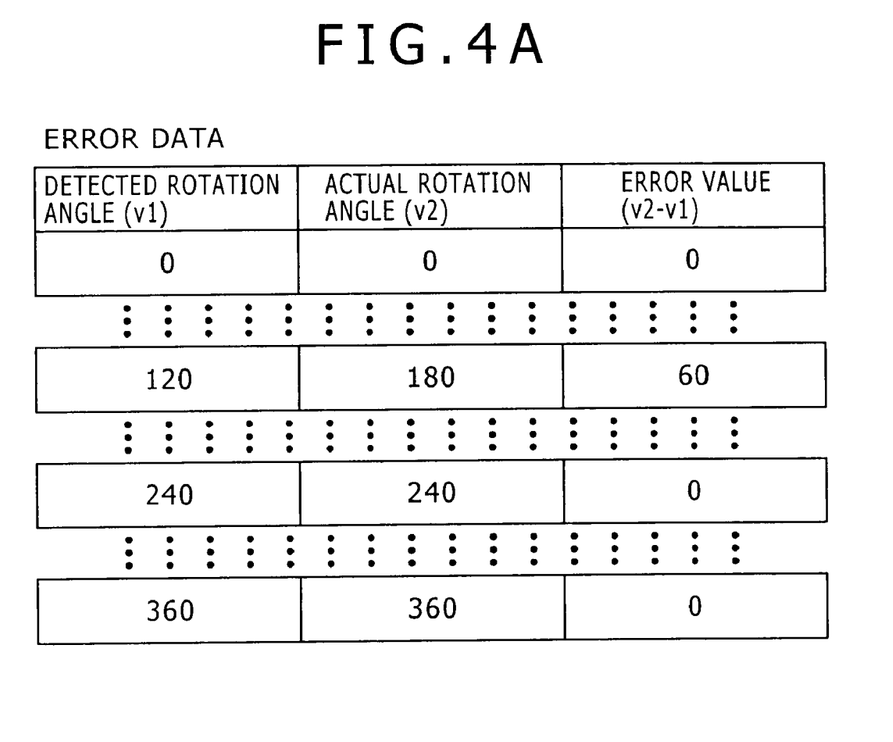
FIGS. 4A and 4B are diagrams of assistance in explaining an example of error data and identifying data.

Next, concretely describing the error data 24 indicating this error, as shown in FIG. 4A, the error data 24 indicates that when the detected angle is v1 degrees, the actual angle is v2 degrees and the error angle is (v2−v1) degrees. The error data 24 indicates that when the detected angle is zero degrees, the actual angle is zero degrees and the error angle is also zero degrees. The error data 24 indicates that when the detected angle is 120 degrees, the actual angle is 180 degrees and the error angle is 60 degrees. The error data 24 indicates that when the detected angle is 240 degrees or 360 degrees, the actual angle is also 240 degrees or 360 degrees, respectively, and the error angle is zero degrees in both cases. Of course, as for other angles, the detected angle, the actual angle, and the error angle are similarly associated with each other directly. Incidentally, the error data 24 may associate only the detected angle and the error value with each other, and thereby associate the detected angle and the actual angle with each other indirectly.

Figure 4B:
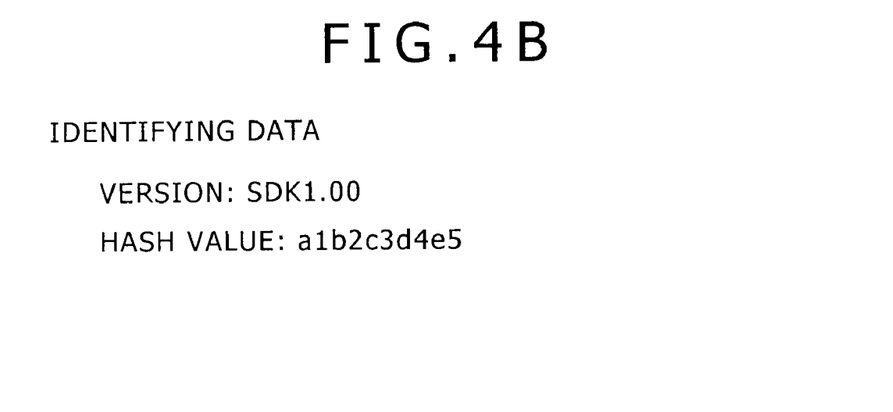

Next, concretely describing the identifying data 25 for identifying the error data 24, as shown in FIG. 4B, the identifying data 25 is character string data of a version "SDK1.00" attached uniquely to each piece of error data 24 and a hash value "a1b2c3d4e5" of the identifying data 25. The identifying data 25 is lower in volume than the error data 24. The identity of the error data 24 can be determined by comparing one or both of the version and the hash value.

An operation of the control system 1 for the motor will next be described. When power to the controlling means 3 is turned on, the CPU 38 starts the motor driving control processing routine not shown in the figures.

Describing as an example a case where the motor driving control processing routine is executed and a rotation controlling command to control the rotation of the motor 21 is externally input, the CPU 38 obtains a detected angle from the resolver 22, retrieves data matching the obtained detected angle from the error data 24 in the nonvolatile memory 44, determines an actual angle from the retrieved data, and controls the rotation of the motor 21 via the motor driving section 39 on the basis of the determined actual angle and the rotation controlling command. The rotation controlling section 31 and the actual angle determining section 32 are implemented by thus executing the motor driving control processing routine.

Figure 5:
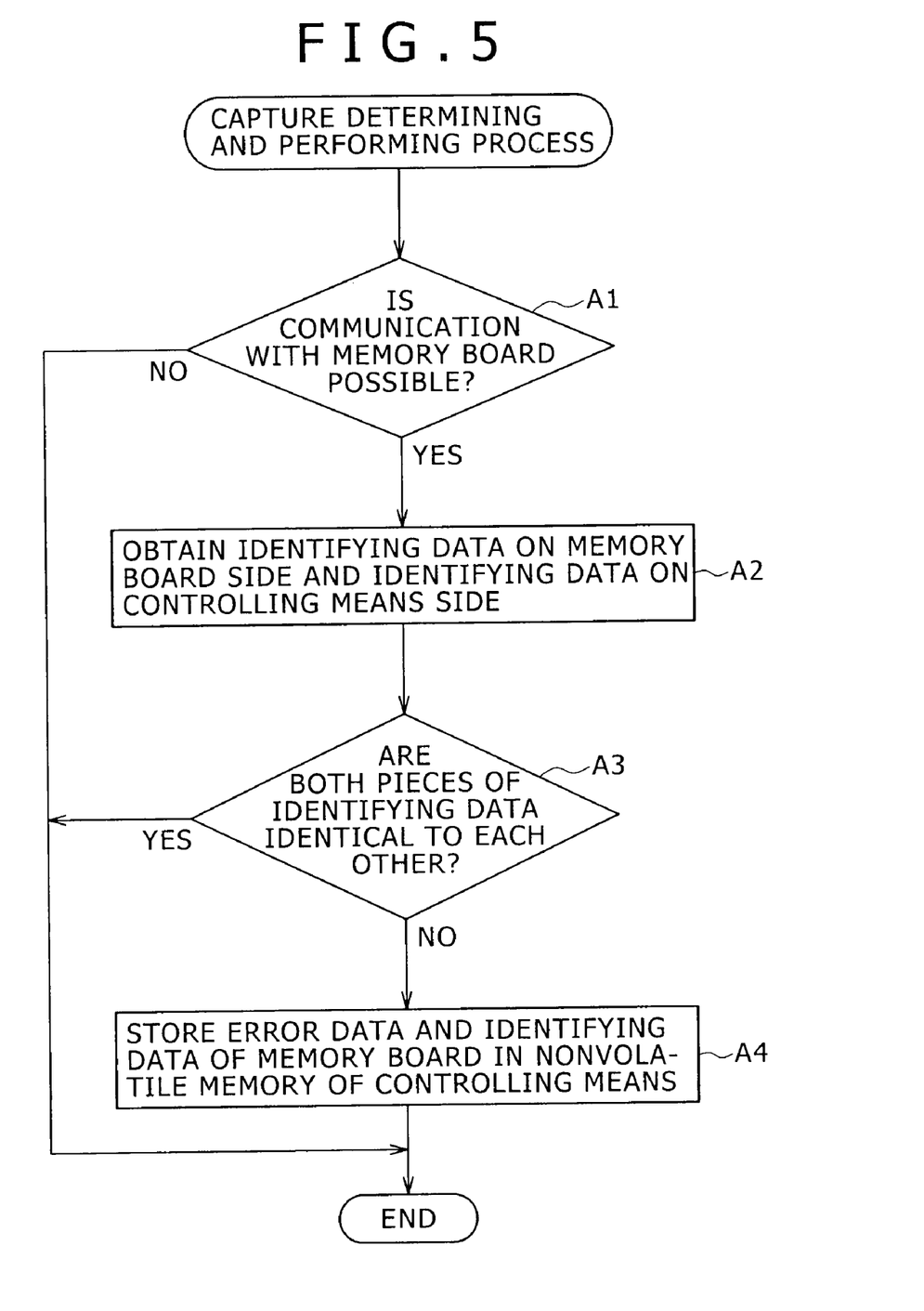
FIG. 5 is a flowchart of a capture determining and performing processing routine executed by controlling means of the same control system for the motor.

In addition, when power to the controlling means 3 is turned on, the CPU 38 starts executing the capture determining and performing processing routine shown in FIG. 5 independently of and in parallel with the abovedescribed motor driving control processing routine.

When the capture determining and performing processing routine is executed, the CPU 38 first determines whether communication with the memory board 5 is possible (A1). When determining that the communication is not possible (A1: NO), the CPU 38 ends the execution of the present routine. When determining that the communication is possible in the process of A1 (A1: YES), on the other hand, the CPU 38 communicates with the memory board 5 to obtain the identifying data 25 stored in the ROM 54 of the memory board 5, and obtains the identifying data 25 stored in the nonvolatile memory 44 of the controlling means 3 (A2). The CPU 38 then determines whether the two pieces of identifying data 25 are identical to each other (A3). When determining that the two pieces of identifying data 25 are identical to each other (A3: YES), the CPU 38 ends the execution of the present routine. The capture determining section 34 is implemented by thus performing the processes of A1 to A3.

When determining that the two pieces of identifying data 25 are not identical to each other (different from each other) in the process of A3 (A3: NO), the CPU 38 communicates with the memory board 5 to read and capture the error data 24 and the identifying data 25 in the ROM 54 of the memory board 5, stores the error data 24 and the identifying data 25 in the nonvolatile memory 44 of the controlling means 3 (A4), and then ends the execution of the present routine. The capture performing section 33 is implemented by thus performing the process of A4.

As described above, the control system 1 for the motor according to the present embodiment is characterized by including: the motor unit 2 including the motor 21 and the resolver 22 for detecting the rotation angle of the motor 21; and the controlling means 3 for determining an actual angle from the detected angle detected by the resolver 22 using the error data 24 between the detected angle of the resolver 22 and the actual angle, and controlling the rotation of the motor 21 on the basis of the determined actual angle, the controlling means 3 being electrically connected in a replaceable state to the motor unit 2; wherein the motor unit 2 includes the motor side memory 23 for storing the error data 24 in advance, and the controlling means 3 includes the controlling side memory 35 for storing the error data 24 used when the actual angle is determined, the capture determining section 34 for determining whether to capture the error data 24 from the motor side memory 23 into the controlling side memory 35 on the basis of the storage of both the memories, and the capture performing section 33 for, when the capture determining section 34 determines that the error data 24 is to be captured, capturing the error data 24 in the motor side memory 23, and storing the error data 24 in the controlling side memory 35.

According to such a configuration, the motor side memory 23 storing the error data 24 is provided in the motor unit 2 including the motor 21 and the resolver 22, whether to capture the error data 24 is determined on the basis of the storage of both the memories of the motor unit 2 and the controlling means 3, and the error data 24 is automatically captured and stored in the controlling side memory 35 by the controlling means 3. It is therefore possible to eliminate the trouble of manual operation and occurrence of errors, and correctly and properly associate the error data 24 of the controlling means 3 with the motor unit 2.

In particular, the capture determining section 34 determines that the error data 24 is to be captured when the pieces of error data 24 of the two memories are different from each other. Then, the error data 24 is automatically captured only when the capture is necessary, that is, only when the pieces of error data 24 of the two memories are different from each other. Therefore unnecessary capture that may occur when the error data 24 is made to be captured automatically can be prevented.

Further, both the memories store the identifying data 25 for identifying the error data 24 stored by both the memories, respectively, the identifying data 25 being lower in volume than the error data 24. The capture determining section 34 determines that the error data 24 is to be captured when these pieces of identifying data 25 are different from each other. Then, because the identifying data 25 is lower in volume than the error data 24, it is possible to shorten time required to read both the memories and time required for communication between the motor unit 2 and the controlling means 3, and shorten time required to determine whether to capture the error data 24 automatically.

Further, when the capture determining section 34 determines whether to capture the error data 24 at the time of the turning on of power, the error data 24 corresponding correctly to the motor unit 2 is surely stored in the controlling side memory 35 at the time of the turning on of power as a stage preceding rotation control. Therefore rotation control based on an actual angle erroneously determined using error data 24 not corresponding correctly to the motor unit 2 can be surely prevented.

One embodiment of the present invention has been described above. However, the concrete configuration of each part is not limited to the above-described embodiment.

Figure 6:
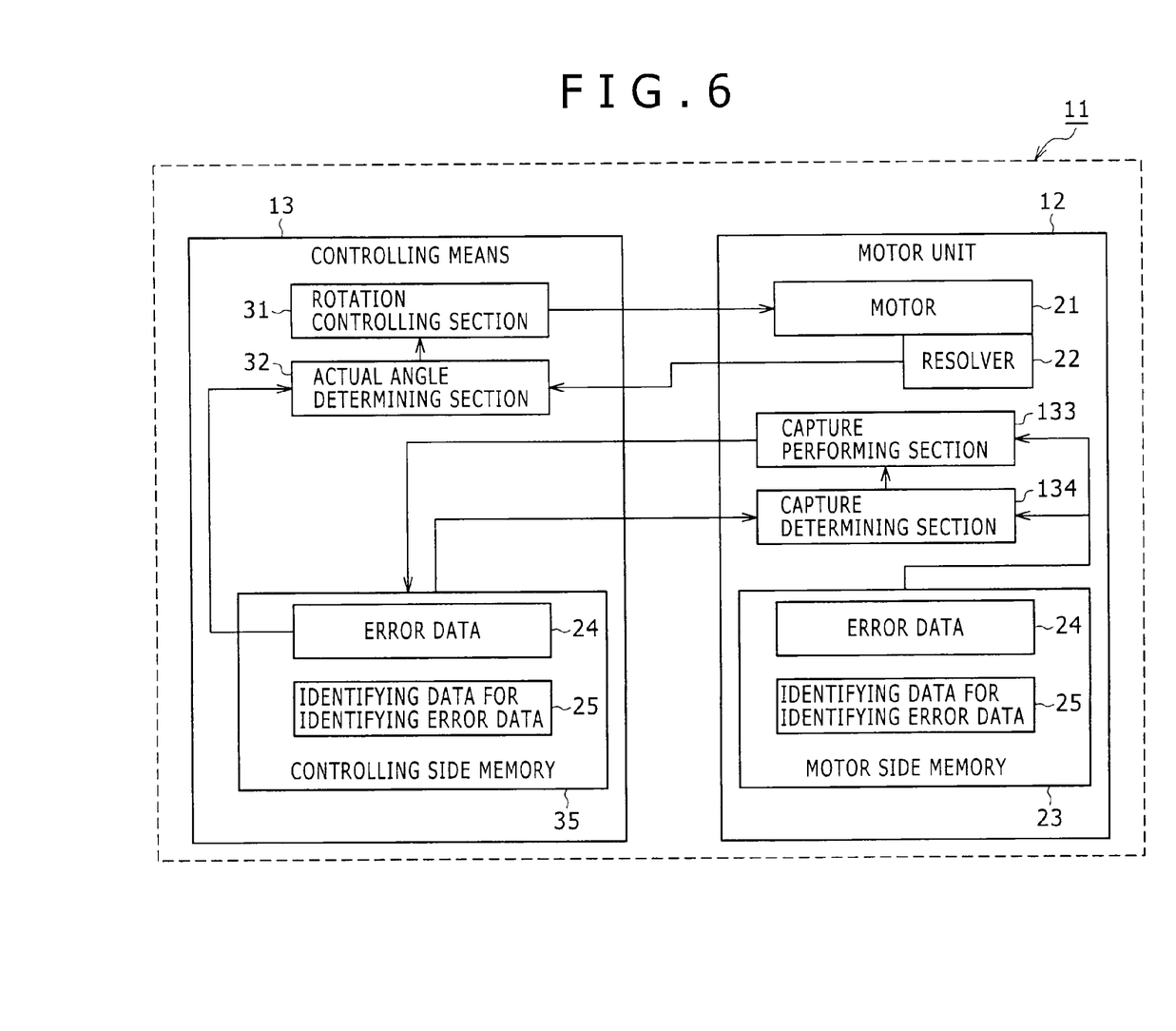
FIG. 6 is a functional block diagram of a control system for a motor according to another embodiment of the present invention.

For example, while the capture determining section 34 and the capture performing section 33 are disposed in the controlling means 3 in the control system 1 for the motor according to the above-described embodiment, a capture determining section 134 and a capture performing section 133 are disposed in a motor unit 12 rather than controlling means 13 in a control system 11 for a motor according to another embodiment shown in FIG. 6. The capture determining section 134 and the capture performing section 133 are implemented by executing a capture determining and performing processing routine substantially similar to the capture determining and performing processing routine shown in FIG. 5 by the CPU 51 of the memory board 5. Incidentally, the capture determining and performing processing routine according to an embodiment which routine is shown in FIG. 5 is different from the capture determining and performing processing routine according to another embodiment which routine is shown in FIG. 6 in that whether communication with the controlling means 3 is possible is determined in the process of A1. Thus, the capture determining section (34 or 134) and the capture performing section (33 or 133) are preferably disposed in one of the controlling means (3 or 13) and the motor unit (2 or 12) as appropriate according to an optimum design.

It is to be noted that the concrete configuration of each part is not limited to the above-described embodiments alone, but is susceptible of various modifications without departing from the spirit of the present invention.

The present application contains subject matter related to that disclosed in Japanese Priority Patent Application JP 2009-069413 filed in the Japan Patent Office on Mar. 23, 2009, the entire content of which is hereby incorporated by reference.

What is claimed is:

1. A motor control system, comprising:
   (a) a motor unit including:
      (i) a motor;
      (ii) a resolver configured to detect a rotational angle of said motor; and
      (iii) a first memory configured to store first error data for detection by said resolver of the rotational angle of said motor; and
   (b) a controller unit configured to electrically connect with said motor unit, said controller unit including:
      (iv) a second memory configured to store second error data for detection by said resolver of the rotational angle of said motor; and
      (v) a motor controller configured to control rotation of said motor, said motor controller configured to determine an actual rotational angle of said motor in accordance with the detected rotational angle detected by said resolver and said second error data stored in said second memory, and said motor controller configured to control rotation of said motor in accordance with the determined actual rotational angle,
   wherein one of said motor unit and said controller unit further includes:
      (vi) an update section configured to update said second error data stored in said second memory with said first error data stored in said first memory in accordance with motor data stored in said first memory and motor data stored in said second memory.

2. The motor control system according to claim 1, wherein:
   said update section is further configured to update said second error data stored in said second memory when said first error data is different from said second error data.

3. The motor control system according to claim 1, wherein:
   said first and second memories store first and second identification data for identifying said first and second error data, respectively;
   said first and second identification data are smaller in volume than said first and second error data; and
   said update section is further configured to update said second error data when said first identification data is different from said second identification data.

4. The motor control system according to claim 1, wherein:
   said update section is further configured to update said second error data at a timing corresponding to when the motor control system is turned on.

5. The motor control system according to claim 1, wherein:
   each of said first and second error data further includes a plurality of error data provided for a plurality of corresponding rotational angles of said motor, respectively.

6. The motor control system according to claim 3, wherein:
   said first and second identification data is provided from identification information of said motor by using a hash function.

7. The motor control system according to claim 1, wherein:
said update section further includes:
- an update determining section configured to determine whether to update said second error data with said first error data in accordance with said motor data stored in said first memory and said motor data stored in said second memory; and
- an update performing section configured to update said second error data with said first error data in accordance with determination of said update determining section.

8. The motor control system according to claim 1, wherein:
said first memory is a read only memory and said second memory is a non-volatile memory.

9. The motor control system according to claim 1, wherein:
said motor unit further includes a first communication interface and a first central processing unit for controlling said first memory and said first communication interface; and
said controller unit further includes a second communication interface for communicating with said first communication interface, and a second central processing unit for controlling said second memory and said second communication interface.

10. A motor control system, comprising:
(a) a motor unit, including:
   (i) a motor;
   (ii) detecting means for detecting a rotational angle of said motor; and
   (iii) first memory means for storing first error data for detection by said detecting means of the rotational angle of said motor; and
(b) a controller unit configured to electrically connect with said motor unit, said controller unit including:
   (iv) second memory means for storing second error data for detection by said detecting means of the rotational angle of said motor; and
   (v) controlling means for determining an actual rotational angle of said motor in accordance with the detected rotational angle detected by said detecting means and said second error data stored in said second memory means, and for controlling rotation of said motor in accordance with the determined actual rotational angle,
wherein one of said motor unit and said controller unit further includes:
   (vi) updating means for updating said second error data stored in said second memory means with said first error data stored in said first memory means in accordance with motor data stored in said first memory means and motor data stored in said second memory means.

11. A method of controlling a motor of a motor unit having a first memory and a resolver configured to detect a rotational angle of said motor, said method comprising:
- comparing motor data stored in said first memory of said motor unit with motor data stored in a second memory of a controller unit electrically connectable with said motor unit, said first memory storing first error data for detection by said resolver of the rotational angle of said motor;
- updating second error data stored in said second memory with said first error data stored in said first memory in accordance with a comparison result of said comparing step;
- determining an actual rotational angle of said motor in accordance with the detected rotational angle detected by said resolver and said second error data stored in said second memory; and
- controlling rotation of said motor in accordance with the determined actual rotational angle.

* * * * *